United States Patent Office 2,880,468
Patented Apr. 7, 1959

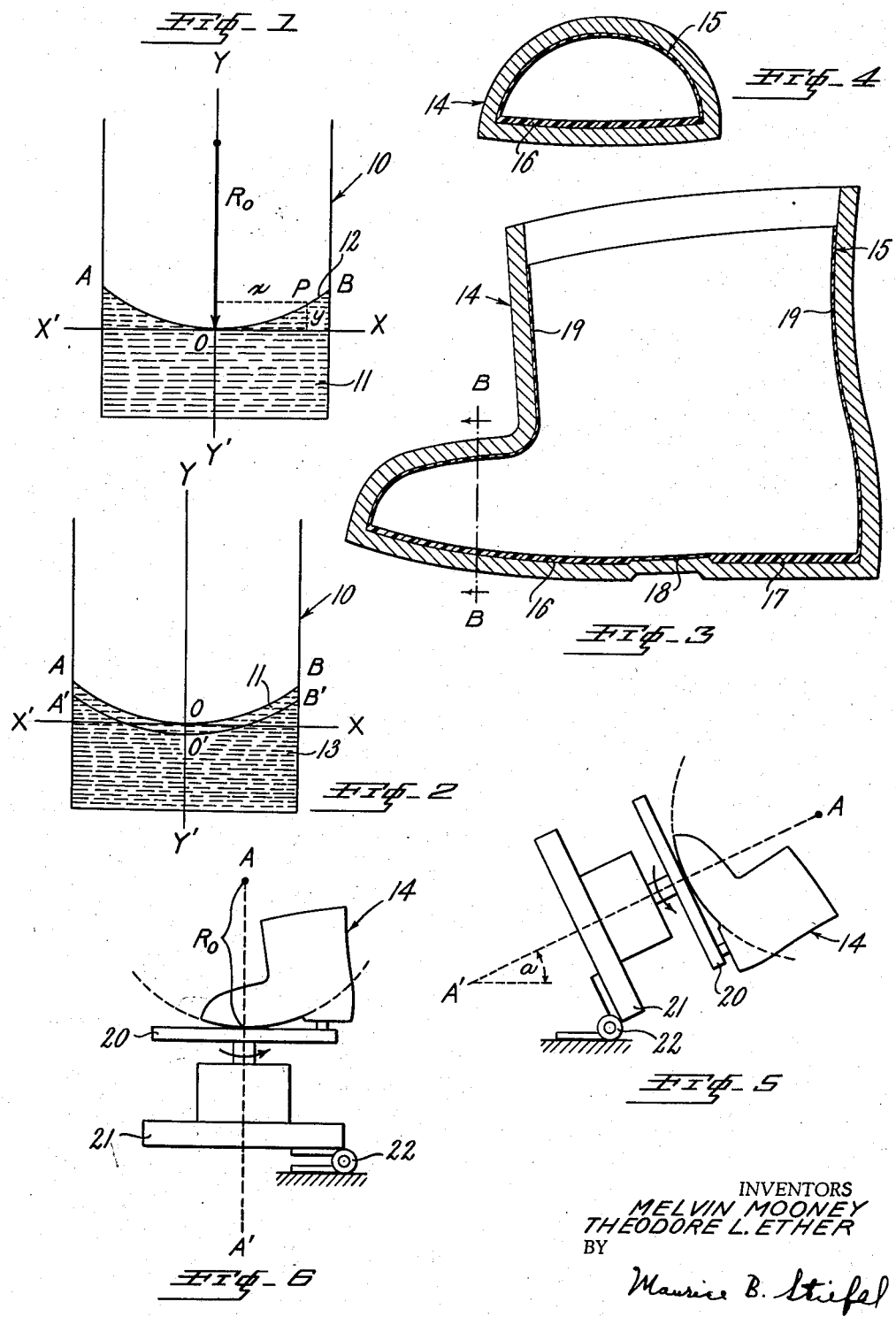

2,880,468

METHOD OF MOLDING ARTICLES

Melvin Mooney, Mountain Lakes, and Theodore L. Ether, Pompton Plains, N.J., assignors to United States Rubber Company, New York, N.Y., a corporation of New Jersey Application October 19, 1956, Serial No. 617,035

4 Claims. (Cl. 18—58.3)

This invention deals with a method of forming an article having a concave curved surface of paraboloidal shape from a liquid material which can be caused to solidify, using the procedure commonly known as casting.

Heretofore such curved surfaces have been obtained by casting the liquid in a multipiece mold assembly which completely defined the surfaces of the article, or alternatively by distributing the liquid on the surface of a mold or form, and maintaining the desired distribution of the liquid on the surface while causing it to solidify, by manipulating the mold or mechanically changing its orientation. Both of these methods have disadvantages, especially when the desired curved surface is an interior surface of a hollow or walled article. Multipiece molds for the first method are often difficult or impossible to design, expensive to make, and time-consuming in use. The second method often requires great skill on the part of the operator, and gives variable results, even with skilled operators.

It is therefore an object of this invention to provide a new method of forming hollow articles from a solidifiable liquid which reduces the amount of manipulation required by the operator during the solidification of the material of which the article is made.

Another object is to provide a method of forming a hollow article, such as a shoe, from a solidifiable liquid, which avoids uneven drainage of the liquid and the resulting unsightly irregularities arising therefrom.

Yet another object of this invention is to provide a method for forming hollow articles from a gellable liquid which results in a superior distribution of materials during the gelling period.

Another object of this invention is to provide a method for molding a shoe from a plastisol, which results in less formation of scrap material, and eliminates "run backs" and gauge irregularities.

Another object of our invention is to produce an article having a concave curved surface of paraboloidal shape rapidly and economically from a solidifiable liquid in a manner whereby reproducible results can be obtained.

Another object of our invention is to produce an article having a concave curved surface of paraboloidal shape from a solidifiable liquid by a method requiring relatively inexpensive molds and not requiring extraordinarily skilled operators.

Additional objects will become apparent hereinafter.

The accompanying drawing illustrates the method of our invention wherein:

Fig. 1 is a sectional view of a rotating cylinder containing a liquid;

Fig. 2 is a sectional view of a rotating cylinder containing a liquid of higher density, and a layer of a liquid of lower density, immiscible with the first liquid and floating on it;

Fig. 3 is a sectional view of a mold in which is contained a boot;

Fig. 4 is a sectional view taken transversely in the plane of B—B in Fig. 3; and Figs. 5 and 6 are schematic views of the apparatus used in the application of our invention to the casting of a boot from a plastisol.

These figures will be more fully described hereinafter.

Our invention depends on the fact that when a body of liquid having a free surface is rotated in a container at constant speed about a vertical axis, the free surface rapidly assumes and maintains a paraboloidal shape, the vertex of the paraboloidal surface being on the axis of rotation. In Figure 1, 10 designates a cylindrical container holding a liquid 11 with a free surface 12. The container is rotated by means not shown at the constant rate of N rotations per second about the vertical axis YY' of the cylinder. Figure 1 shows a vertical cross-section in a plane including the axis YY'. The surface 12 assumes a paraboloidal shape which is characterized by the quantity or parameter $a$ in the equation (1) $$y = ax^2$$

This is the equation of a parabola, and represents the curved line AOB in Figure 1. In the equation, $y$ is the vertical distance from a given point P on the curve to the horizontal axis XX' passing through the vertex O of the parabola; $x$ is the horizontal distance from the given point to the vertical axis YY'; and $a$ is a quantity determined by the rate of rotation N, given by the equation (2) $$a = \frac{2\pi^2 N^2}{g}$$

$g$ being the gravitational acceleration. Since the radius of curvature of the parabola varies from point to point on the parabola but otherwise depends only on $a$ and hence on N, it will be apparent that the curvature of the liquid surface is determined by the rate of rotation N. It should be noted that the curvature of the surface does not depend on the viscosity, density, or other property of the liquid. It should also be noted that the curvature of the surface is unaffected by any asymmetry of the container, by irregularities in depth of the liquid, or by the location of the axis of rotation. In all cases the liquid surface is paraboloidal, with the vertex on the axis of rotation, and with curvature determined by the rotational rate N.

In Fig. 2, which illustrates the principle of another form of our method, 10 designates a cylindrical container holding a liquid 13, on the upper surface of which floats a layer 11 of a second liquid which is at most only partially miscible with the first liquid 13, and which has a lower density than the first liquid. Upon rotating the container about the vertical axis YY', the upper surface of the liquid 11 assumes a paraboloidal shape, with the vertex at O, represented by AOB in the vertical sectional view in Fig. 2. The interface between the two liquids also assumes a curved surface, represented by A'O'B', which is identical in shape with the upper surface of liquid 11. Liquid 11 thus forms a layer with a concave upper surface and a convex lower surface; the thickness of the layer depends on the amount of liquid 11 that is used.

In our invention, a suitable amount of a liquid which can be caused to solidify is introduced into a mold, form, or other container of suitable shape and dimensions. The container and the liquid are then rotated about a vertical axis at such a speed as to cause the surface of the liquid to assume the desired paraboloidal shape. The liquid is caused to solidify while rotation is continued at a constant rate. Rotation is then stopped, and the solid article is removed from the container.

While the shape of the surface thus formed is paraboloidal, it is well known that the portion of a paraboloidal surface adjacent to the vertex is, to a close approximation, spherical. Hence the method of our invention may often be used to obtain a surface which is, to a sufficient degree of approximation over a limited area, spherical. The radius of curvature $R_0$ of the surface at the vertex is given in terms of the quantities $a$ and $N$ by the relationships:

(3) $$R_0 = \frac{1}{2a} = \frac{g}{4\pi^2 N^2}$$

It will be evident that the scope of our invention is very broad, both as regards the liquid used and as regards the article formed. Any liquid may be used which can be caused to solidify while being rotated in a container as described. Such solidification may be brought about in any of a number of ways, such as by cooling, by bringing about a chemical reaction (e.g. polymerization of liquid monomers), or by gelation (e.g. of a gelatin or a silicate solution, or of a so-called plastisol). Our invention is limited to the production of an article having a concave paraboloidal or approximately spherical surface. It should be noted, however, that our invention may be practiced to form only that portion of an article having such a surface, other portions of the article being formed in separate steps by other methods.

Our invention is very suitable for use in a process for producing a flexible molded waterproof shoe from a liquid plastisol by the "slush molding" technique.

The general methods of molding plastisols are well known. Such methods are reviewed briefly in "Modern Plastics Encyclopedia and Engineers' Handbook," pp. 190 and 553 (1954). More detailed discussions are given in "Modern Plastics," 27, p. 111 (1949); 28, p. 101 (1950); 29, p. 87 (1951); 30, p. 116 (1952); 30, p. 97 (1953). See also U.S. Patent 2,588,571, which describes methods for making shoes in which the present invention is applicable.

In making a shoe by the "slush molding" technique, a layer of liquid plastisol is deposited on the interior surface of a mold, and the mold is then heated to gel and eventually to fuse the plastisol. A number of difficulties have been encountered in carrying out this type of process, due to uneven drainage of the plastisol before and during gelling. This causes unsightly irregularities in both the upper portions and the sole portions of the shoe. Heretofore manipulation of the mold by the operator during the gelling operation was relied upon to achieve even distribution of the material. Such manipulation was costly and far from satisfactory.

The practice of our invention in casting a shoe from plastisol may be summarized as follows. A mold is mounted so that it can be rotated, during gelling of the contained plastisol, about an axis which usually passes through the sole section of the boot and is normal to it. During gelling of the upper portion of the shoe, the mold is rotated relatively slowly with the axis of rotation inclined to the vertical so that the open end of the mold is slightly elevated; this results in slow and randomly directed drainage, giving uniform gauge in the upper portion. Gelling of the upper portion is carried out in such a way that there is still at least some liquid plastisol left in the sole portion when gelling of the upper portion is substantially complete. During the subsequent gelling of the sole portion, the mold is rotated with the axis of rotation vertical. The location of the axis of rotation and the rate of rotation are such as to cause the inner surface of the liquid plastisol in the sole portion to assume and retain a paraboloidal shape, parallel to the inner mold surface. This results in a sole portion of uniform gauge. Plastisol to form the heel is then aded and gelled as a separate step.

A plastisol as used in our invention consists of a dispersion of a finely divided solid plastic or resinous high polymeric material in a liquid plasticizer of relatively low volatility. The plastic and the plasticizer are chosen to have a miscibility-temperature relationship such that in the neighborhood of room temperature they are practically immiscible, while at sufficiently high temperatures, in the so-called fusion temperature range, they become completely miscible. An intermediate temperature range, called the gelling range, usually exists within which range the plastic is swollen by the plasticizer to a limited extent. The relative amounts of plastic and plasticizer used are such that the mixture, when made at room temperature, is a viscous fluid, and remains in this state indefinitely until it is heated. Upon raising the temperature, the viscosity at first decreases. When the temperature reaches the intermediate gelling range, gelling occurs, within the material gradually increasing in viscosity and eventually becoming a non-fluid, somewhat elastic, but deformable gel. Upon further heating to the fusion temperature range, complete swelling of the plastic in the plasticizer occurs, resulting in a material closely resembling vulcanized rubber in its elastic and tensile characteristics. The fused plastisol retains these characteristics indefinitely. (Loss of plasticizer by evaporation or extraction will, of course, cause embrittlement.)

A plastisol suitable for use in the method of our invention is made as follows. 100 parts by weight of a finely divided polyvinyl chloride polymer, having a range of particle diameters from about 0.2 to 0.8 micron and an intrinsic viscosity in cyclohexanone of about 1.26, are stirred at a temperature below the intermediate "gelling" range with 70 parts by weight of dioctyl phthalate until the polymer becomes uniformly dispersed in the dioctyl phthalate. Before use, the mixture is again stirred to assure uniformity, and dispersed air bubbles are removed if necessary.

It should be noted that the above is only one example of many plastisols which could be used in the method of our invention. Thus, plastisols made with polyvinyl chloride or copolymers containing a major proportion of vinyl chloride would be suitable. Such a composition could have as the liquid component a high-boiling ester of relatively low viscosity, such as di-2-ethylhexyl or dicapryl phthalate; tricresyl, trioctyl, etc., phosphates; adipate esters, sebacate esters; etc. Further, suitable pigments, fillers, and stabilizers, may be introduced into the mixture to obtain desired effects.

A boot mold suitable for use in the method of our invention is shown in Fig. 3, which represents a vertical cross-section extending through the mold centrally from heel to toe, and Fig. 4, which represents a vertical cross-section taken transversely in the plane of B—B in Fig. 3. The mold 14 contains the boot 15. The boot comprises a sole portion 16 and a heel portion 17 of relatively heavy gauge, and instep portion 18 and upper portions 19 of relatively light gauge. The inner surface of the mold adjacent to the sole portion is paraboloidal, the vertex usually being at or near the center of the sole. The shape and dimensions of the mold are such that the finished boot can be removed through the opening at the top; otherwise the mold may have any desired shape and dimensions. It can be embossed, engraved, or otherwise treated on its internal surface to produce desired decorative effects.

The material of which the mold is made should preferably have good thermal conductivity, and a metal is generally used. The wall thickness of the mold should be uniform in order to insure a uniform rate of heat transfer through the walls, unless it is desired to vary the rates and amounts of heat transfer to different parts of the shoe by varying the thickness of the mold. The mold may be provided with suitable fittings, not shown, for handling and for attachment to the apparatus used in the process. Suitable molds can be made by such well-known methods as electroforming or spraying. The production of molds for slush molding of plastisols is discussed in "Plastics Engineering Handbook of the Society of the Plastics Industry, Incorporated," page 307 (1954 ed.), and also in "Modern Plastics," 30, p. 97 (1953). Electroformed molds are made of copper, and are often preferred because they are inexpensive and can be made easily and quickly. Aluminum and steel molds may also be used.

In a typical method heretofore used in the casting of a shoe, the following steps were employed:

(1) The mold, which had been preheated to approximately 160° F. (a temperature insufficiently high to gel the plastisol rapidly) was filled with plastisol.

(2) The mold was immersed in a first liquid heating bath for a predetermined length of time, sufficient to cause a desired thickness of gelled plastisol to be deposited on the inner surface of the mold.

(3) The mold was removed from the first bath, and the liquid plastisol poured off. At this point the mold contained, besides the gelled plastisol, enough ungelled liquid plastisol to complete the shoe; it retained enough heat to gel the liquid plastisol remaining. The operator then manipulated the form while the liquid plastisol was undergoing gelation to distribute the material in the desired proportions in the sole, heel, and upper portions, and to obtain a uniform gauge in each portion.

(4) After the gelling was substantially completed, the mold was immersed in a second liquid bath at a higher temperature for a long enough time to fuse the plastisol completely. The mold was then cooled, and the shoe was stripped from it.

While the above process has been used to produce a salable product, excessive scrap rates frequently prevail. These usually occur during start-up periods, when changes in mold style are made, or when the plastisol batch thickens, due to repeated heating in step (2) above. Rejections are due mainly to thick streaks called "run backs" in the upper portions, and to irregularities in gauge in the sole portion, which spoil the appearance of the shoe. The defects are due to poor distribution of material during the gelling period in step (3). A high degree of skill and much experience is required of the operator, and even the best of operators get poor results all too frequently.

The improved process of our invention will now be described. The apparatus consists of a means for supporting the mold and rotating it at a controlled variable speed about an axis which coincides with the axis of the paraboloidal surface of the sole portion of the mold. Means are also provided for orienting the axis of rotation at any desired angle with the horizontal. A form of apparatus which has been used in laboratory experiments, shown diagrammatically in Figs. 5 and 6, consists of a turntable 20 with a variable speed drive, mounted on a platform 21 hinged at 22, so that it can be tilted at any desired angle. The mold 14 is clamped to the turntable in an upright position, with the sole against the upper surface of the turntable, the axis of rotation A—A' of the turntable coinciding with the axis of the paraboloidal sole surface.

The following steps are used in carrying out our invention:

(1) The mold (which may be warm or at room temperature) is filled with plastisol, and emptied at once. It is allowed to drain for a time such that the amount of plastisol left in the mold is just enough to form the upper and sole portions of the shoe in steps (2) and (3).

(2) The mold is clamped at once to the turntable with the axis of rotation at an angle of about 30° with the horizontal, as shown at $a$ in Fig. 5, and rotation at about 15 r.p.m. is started. Heating of the upper portion of the mold is started immediately. During this step in the process, part of the plastisol on the inner surface of the upper portions of the mold is gelled to form the upper portion of the shoe. The remainder of the plastisol drains to the bottom of the mold, and serves to form the sole portion of the shoe in the following step (3). Rotation of the mold at this angle promotes uniform random drainage at a slow rate, and also promotes even distribution of the heat applied to the mold, resulting in a smooth gelled layer of uniform gauge in the upper portion of the mold. Some deposition of gel on the sole and heel portions of the mold may occur, but a part of the plastisol remains as liquid at the end of the gelation of the upper portion in this step. The viscous properties of the plastisol, the initial temperature of the plastisol and the mold, the rate of rotation and angle of inclination of the mold, and the rate and duration of heating are factors affecting this step in the process. Optimum conditions are determined by experiment.

(3) The turntable is reoriented so that the axis of rotation is vertical (i.e. the turntable is horizontal), as shown in Fig. 6, and rotation of the turntable is stopped long enough to tilt the mold momentarily so as to cause the liquid plastisol to flow into the sole portion of the mold, leaving the heel portion substantially empty. Rotation is then resumed at such a rate that the surface of the liquid plastisol in the sole portion assumes a paraboloidal shape which conforms to the shape of the inner surface of the mold. The sole portion of the mold is heated while the rotation is maintained, to gel the plastisol and thus form a sole portion having a smooth curved inner surface and a uniform gauge.

(4) Rotation of the turntable is stopped, and the mold is removed from the turntable. With the mold in a vertical position, plastisol to form the heel portion is introduced into the heel cavity, and heat is applied to gel the heel portion.

(5) The mold is heated to fuse the plastisol, and then cooled. The finished shoe is stripped from the mold.

It is important to note that the procedure in step (3) above is very different from the prior art method known as centrifugal casting, in which the mold is rotated at any speed sufficient to throw the liquid against the walls of the mold and keep it there while gelling occurs. In our method, the speed of rotation must be closely controlled to give a surface of the desired shape. The required speed may be calculated from the following formula:

$$N = \left(\frac{1}{2\pi}\right)\left(\frac{g}{R_0}\right)^{1/2}$$

where N is the required velocity of rotation in revolutions per second, $R_0$ shown in Fig. 6 is the desired radius of curvature of the paraboloidal surface at the vertex, and $g$ is the acceleration of gravity, expressed in appropriate units. N is independent of the density and the vicosity of the liquid.

Another difference between the prior art's centrifugal casting and our method of rotating at a speed to impart a paraboloidal shape to the liquid surface, is that centrifugal casting can be carried out with the axis of rotation at any angle with the vertical so long as the rotational speed is high enough. In our method, the axis of rotation must be vertical.

With respect to step (1) of our method, it should be noted that a cold mold is used, and excess plastisol is emptied out before heating begins. In this manner, any heating of unused plastisol, thereby causing objectionable thickening, is avoided.

In another useful application of our invention, a sheet of material having curved substantially parallel surfaces can be made, using the method illustrated in Fig. 2. For example, a layer of a plastisol such as is described above is floated on the surface of a liquid that is of higher density and is immiscible with the plastisol (e.g. mercury). The container holding the liquids is rotated about a vertical axis at a constant speed, while the plastisol is heated to fuse it.

In a patent application by Theodore L. Ether, Serial Number 577,296, filed April 10, 1956, the specification of which is hereby incorporated by reference, there is described a method for the manufacture of polyurethane foam sheets. This method comprises supporting a layer of a liquid mixture, which forms such a foam by gas expansion to a fluid foam and subsequent gelation to a solid foam, on the surface of a carrier liquid during expansion and gelation. We find that, by rotating the container of the foam-forming and carrier liquids in accordance with the present invention, as described in the preceding paragraph, we obtain thin, uniform sheets of polyurethane foam having curved substantially parallel surfaces.

It is to be understood that our invention is not to be limited to the specific applications described above, nor otherwise limited except as set forth in the following claims.

Having thus described our invention, what we claim and desire to protect by Letters Patent is:

1. A method of forming a shoe having a sole with a concave paraboloidal inner surface by gelling a plastisol in a mold which is mounted to rotate about an axis coinciding with the axis of said paraboloidal surface, which method comprises rotating said mold about said axis with said axis inclined at an angle with the vertical during the gelation of a part of the plastisol, thereby to form the upper portions of said shoe, and then adjusting said axis of rotation to be vertical and rotating said mold about said axis during gelation of another part of said plastisol, thereby to form the inner sole surface of said shoe, the speed of rotation being such as to cause the surface of said plastisol to assume the desired paraboloidal shape.

2. A method of forming a shoe having a sole with a concave paraboloidal inner surface by gelling a plastisol in a mold which is mounted to rotate about an axis coinciding with the axis of said paraboloidal surface, which method comprises rotating the mold about the axis with the axis inclined at an angle with the vertical during the gelation of a part of the plastisol, thereby to form the upper portions of said shoe, and then causing the axis of rotation to be vertical and rotating the mold about the axis during gelation of another part of the plastisol, thereby to form the inner sole surface of said shoe, the speed of rotation being given by the formula $$N = \frac{1}{2\pi}\left(\frac{g}{R_0}\right)^{1/2}$$

where N is the velocity of rotation in rotations per second, $R_0$ is the radius of curvature of the desired paraboloidal surface at its vertex, and g is the acceleration of gravity.

3. A method of forming a shoe having a sole with a concave paraboloidal inner surface by gelling a liquid capable of being solidified in a mold which is mounted to rotate about an axis coinciding with the axis of said paraboloidal surface, which method comprises rotating said mold about said axis with said axis inclined at an angle with the vertical during the gelation of a part of the liquid, thereby to form the upper portions of said shoe, and then adjusting said axis of rotation to be vertical and rotating said mold about said axis during gelation of another part of said liquid, thereby to form the inner sole surface of said shoe, the speed of rotation being such as to cause the surface of said liquid to assume the desired paraboloidal shape.

4. The method of forming a shoe having a sole with a concave paraboloidal inner surface by polymerizing liquid monomers capable of being solidified by polymerization, said polymerization being carried out in a mold which is mounted to rotate about an axis coinciding with the axis of said paraboloidal surface, which method comprises rotating said mold about said axis with said axis inclined at an angle with the vertical during the polymerization of a part of the liquid monomers, thereby to form the upper portions of said shoe, and then adjusting said axis of rotation to be vertical and rotating said mold about said axis during the polymerization of another part of said liquid monomers, thereby to form the inner sole surface of said shoe, the speed of rotation being such as to cause the surface of said liquid monomers to assume the desired paraboloidal shape.

References Cited in the file of this patent

UNITED STATES PATENTS

| | | |
|---|---|---|
| 669,119 | Krank | Mar. 5, 1901 |
| 2,671,932 | Pique | Mar. 16, 1954 |
| 2,719,327 | Pique | Oct. 4, 1955 |

OTHER REFERENCES

Lever: Expanded and Foamed Materials, Plastics, August 1953, pp. 274–277.

UNITED STATES PATENT OFFICE
Certificate of Correction

Patent No. 2,880,468                                                 April 7, 1959

Melvin Mooney et al.

It is hereby certified that error appears in the printed specification of the above numbered patent requiring correction and that the said Letters Patent should read as corrected below.

Column 2, line 7, for "vetrical" read —vertical—; lines 28 to 30, the equation should appear as shown below instead of as in the patent:

$$a = \frac{2\pi^2 N^2}{g}$$

column 3, lines 6 to 8, the equation should appear as shown below instead of as in the patent:

$$R_0 = \frac{1}{2a} = \frac{g}{4\pi^2 N^2}$$

line 69, for "aded" read —added—; column 4, line 13, for "within" read —with—; column 6, lines 37 to 39, the formula should appear as shown below instead of as in the patent:

$$N = \left(\frac{1}{2\pi}\right)\left(\frac{g}{R_0}\right)^{\frac{1}{2}}$$

line 44, for "vicosity" read —viscosity—; column 7, lines 36 to 38, the formula should appear as shown below instead of as in the patent:

$$N = \frac{1}{2\pi}\left(\frac{g}{R_0}\right)^{\frac{1}{2}}$$

Signed and sealed this 4th day of August 1959.

[SEAL]

Attest:
KARL H. AXLINE,
*Attesting Officer.*

ROBERT C. WATSON,
*Commissioner of Patents.*